United States Patent
Mourou et al.

[11] Patent Number: 5,235,606
[45] Date of Patent: Aug. 10, 1993

[54] AMPLIFICATION OF ULTRASHORT PULSES WITH ND:GLASS AMPLIFIERS PUMPED BY ALEXANDRITE FREE RUNNING LASER

[75] Inventors: Gerard A. Mourou; Jeffrey Squier; John S. Coe; Donald J. Harter, all of Ann Arbor, Mich.

[73] Assignees: University of Michigan, Ann Arbor, Mich.; Allied-Signal Inc., Morris Township, Morris County, N.J.

[21] Appl. No.: 784,232

[22] Filed: Oct. 29, 1991

[51] Int. Cl.⁵ .............................................. H01S 3/10
[52] U.S. Cl. ........................................ 372/25; 372/69; 372/20
[58] Field of Search .................. 372/69, 25, 29, 30, 372/31, 20; 359/559, 154

[56] References Cited

U.S. PATENT DOCUMENTS

| | | | |
|---|---|---|---|
| 4,655,547 | 4/1987 | Heritage et al. | 359/559 |
| 4,910,746 | 5/1990 | Nicholson | 372/92 |
| 4,928,316 | 5/1990 | Heritage et al. | 359/154 |

*Primary Examiner*—Léon Scott, Jr.
*Attorney, Agent, or Firm*—Rohm & Monsanto

[57] ABSTRACT

A system for producing ultra-high peak power pulses employs a plurality of solid state amplifying materials, such as Nd:glass, alexandrite, and Ti:sapphire, to achieve stretching of a pulse prior to amplification by a factor of approximately between 100 and 10,000. The time-stretched pulse is amplified by many orders of magnitude, illustratively $10^9$. After time-stretching and amplification, the pulse is then recompressed to its original duration. Pumping of the multiple solid-state elements is performed simultaneously using an alexandrite laser which is tunable between approximately 700 and 800 nm. The pumping energy has a pulse duration which is less than the fluorescence lifetime of the excited solid-state media.

18 Claims, 2 Drawing Sheets

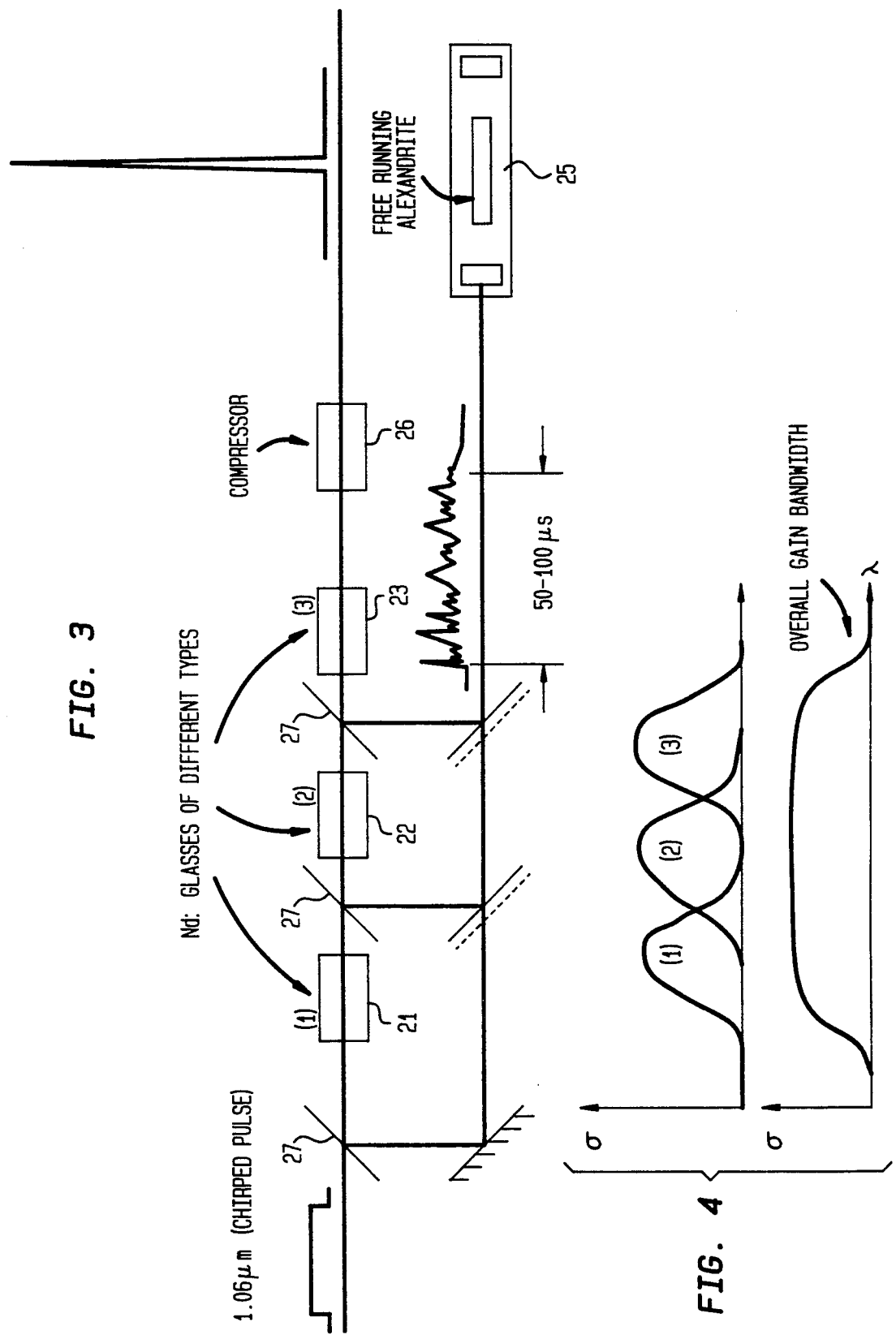

AMPLIFICATION OF ULTRASHORT PULSES WITH ND:GLASS AMPLIFIERS PUMPED BY ALEXANDRITE FREE RUNNING LASER

GOVERNMENT RIGHTS

This invention was made with government support under Cooperative Agreement No. PHY-8920108, awarded by the National Science Foundation. The government has certain rights in the invention.

BACKGROUND OF THE INVENTION

This invention relates generally to the interaction of ultra-intense optical pulses with matter, and more particularly, to a system of optical pumping for use with chirped pulse amplification laser systems which employ solid-state amplifying media with excellent energy storage capability.

The interaction of ultra-intense ($10^{16}$–$10^{18}$ W/cm$^2$) optical pulses with matter represents an important new field in physics. For example, this field of study is opening new vistas in the production and amplification of coherent beams of x-rays. The concept of chirped pulses amplification (CPA), which was first demonstrated by one of the co-inventors herein, resulted in the generation of ultra-intense pulses from extremely compact laser systems. The peak power of this new source exceeded conventional lasers by three orders of magnitude. However, the repetition rate of the CPA laser system, based on Nd:glass amplifiers was mediocre: illustratively on the order of one laser shot every 30 seconds. There is a need for a system which is capable of increasing the repetition rate of the laser. Preferably, such increase in the repetition rate should be on the order of 100 times.

It is, therefore, an object of this invention to provide a table-top terawatt laser system.

It is another object of this invention to provide an economical system for amplifying ultrashort pulses.

It is also an object of this invention to provide a chirped pulse amplification system which can achieve many times the repetition rate of conventional systems.

It is a further object of this invention to provide a laser pumping system which provides an increase in pumping efficiency while reducing the thermal load in a laser rod.

It is additionally an object of this invention to provide a system for improving the coupling efficiency between an optical pump and a lasing medium.

SUMMARY OF THE INVENTION

The foregoing and other objects are achieved by this invention which provides, in a method aspect thereof, a method of amplifying a short optical pulse for producing an ultra-high peak power pulse. In accordance with the invention, the method includes the steps of stretching the short optical pulse in time by a factor of approximately between 1000 and 12,000, amplifying the time-stretched pulse in a solid-state amplifying media, and recompressing the amplified time-stretched pulse in time.

The step of amplifying is performed to an amplification factor of illustratively $10^3$, and preferably on the order of $10^9$. Subsequently, the time-stretched pulse is recompressed to a shorter duration. In some embodiment of the invention, the duration of the pulse after recompressing matches that of the original short optical pulse.

In a preferred embodiment of the invention, amplification of the pulse is achieve in a Nd:glass. The Nd:glass material is pumped with an optical energy which is produced by an alexandrite laser. In some embodiments, the alexandrite laser is itself pumped with a flash lamp, and the laser output may have a plurality of wavelengths therein, illustratively 740 nm, 800 nm, and 820 nm. As will be described herein, the application of the optical pumping energy to the Nd:glass rods produced fluorescence having a lifetime of approximately 250 $\mu$s. The alexandrite laser is operated so as to have a pulse duration which is shorter than the lifetime of the excited state of the Nd:glass, which pulse duration is approximately between 50 and 100 $\mu$s. When an alexandrite laser is operated in a free-running mode, the resulting pulses will contain energy on the order of 1–15 J each.

In accordance with a system aspect of the invention, a system is provided for amplifying a short optical pulse for producing an ultra-high peak power pulse. The system is provided with a plurality of Nd:glass rods, which preferably are arranged in an optically serial arrangement. An optical pump is employed for pumping the plurality of Nd:glass rods simultaneously.

In a preferred embodiment, the serial arrangement of Nd:glass rods is arranged to have at an optical input of one of the rods the ability to receive the short optical pulse which is intended to be amplified. The optical pulse, once received, is subjected to the process steps indicated herein, which include stretching in time, amplification, and compression in time. Compression is achieved by a compressor which reduces the duration of the output pulse.

As previously indicated, the optical pump is preferably an alexandrite laser. This laser is operated in a free-running mode, and issues pulses which have a shorter duration than the fluorescence lifetime of the excited state.

In a further embodiment of the invention, the plurality of Nd:glass rods are formed of respectively different types of glass. As such, each rod has a different central frequency, which may range from 10460 Å to 10880 Å.

BRIEF DESCRIPTION OF THE DRAWING

Comprehension of the invention is facilitated by reading the following detailed description, in conjunction with the annexed drawing, in which:

FIG. 3 is a schematic representation of individual Nd:glass rods pumped by a common free-running alexandrite laser, in accordance with the invention; and FIG. 4 is a graphical plot which shows the manner in which the individual rods combine to produce an overall gain bandwidth.

DETAILED DESCRIPTION

Figure 1:
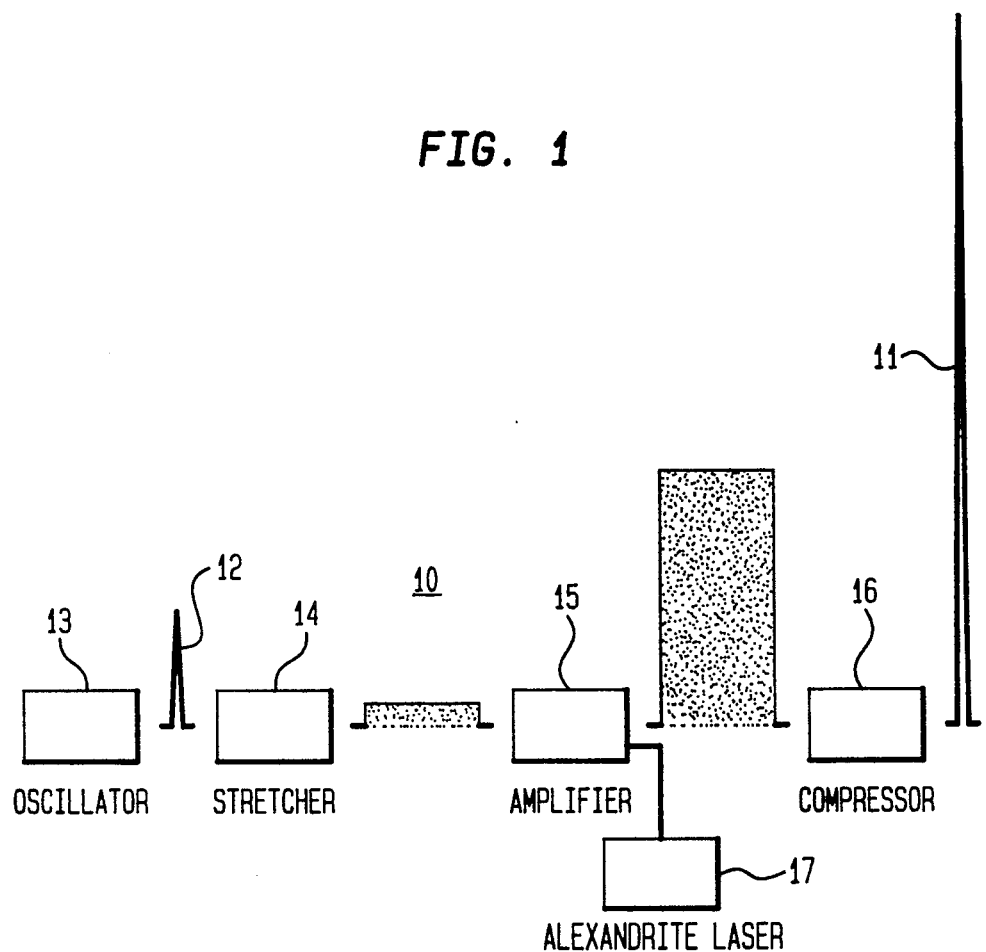
FIG. 1 is a schematic representation of a chirped pulse amplification arrangement.

FIG. 1 is a schematic representation of a chirped pulse amplification arrangement 10, wherein an ultra-high peak power pulse 11, which is one of a multiplicity of pulses which are produced by the amplification arrangement, can be produced by amplifying short optical pulses, such as pulse 12, which is but one of multiple pulses produced by an oscillator 13. The arrangement, as will be discussed below, operates in a solid-state amplifying media (not specifically shown in this figure) with excellent energy storage capability. Amplifying materials are Nd:glass, alexandrite, and Ti:sapphire. As shown, the pulse is stretched temporally prior to amplification by a factor of 100 to 10,000, by a stretcher 14.

After it is stretched the pulse is amplified by many orders of magnitude, i.e., about $10^9$, in an amplifier 15 which is pumped by an alexandrite laser 17. The amplified pulse is then recompressed to its original duration, in a compressor 16. The stretcher and compressor, in this embodiment, are specifically designed to be perfectly compensating of one another, preserving both the spatial and temporal quality of the laser pulse. In systems using Nd:glass such as first demonstrated by Strickland, et al. the amplifiers were pumped with flash lamps. However, because of the difference in the emission spectrum of the flash lamps, the absorption band of the amplifying media, and the wavelength at which the laser operates, flash lamp pumping is extremely inefficient (around 1%). Consequently, most of the energy contributes to heating up the amplifier and therefore limits the repetition rate. To improve the repetition rate, and subsequently the average power, the thermal load in the laser rod must be minimized. This can be done by improving the coupling efficiency between the optical pump and the lasing medium.

Figure 2:
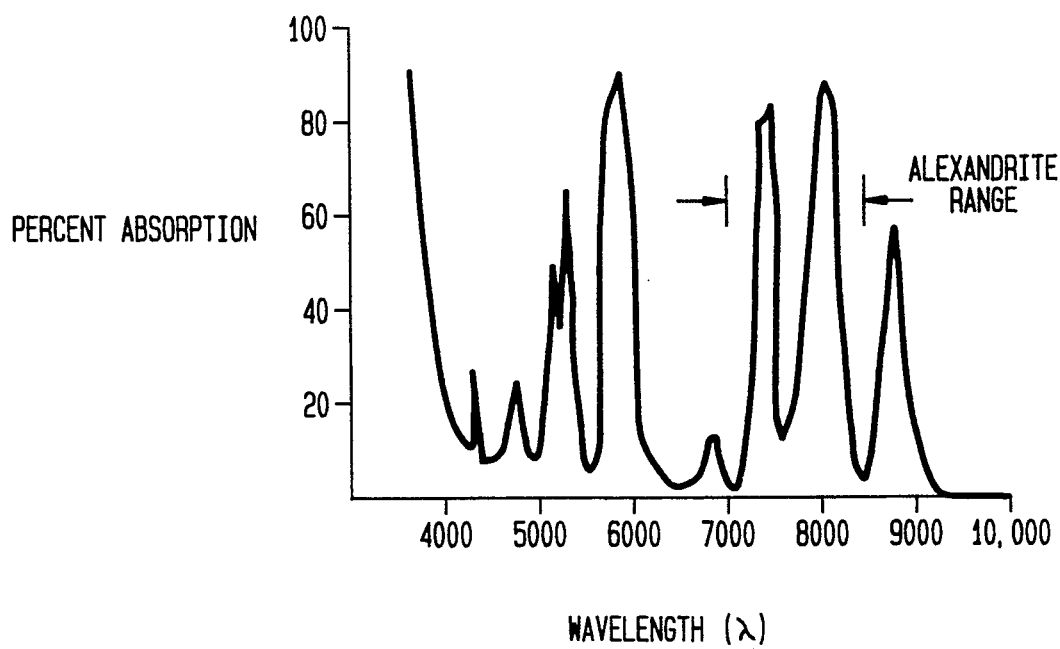
FIG. 2 is a graphical plot of the percent of absorption versus wavelength, specifically noting the alexandrite range.

FIG. 2 is a graphical plot of the percent of absorption versus wavelength, specifically noting the alexandrite range of wavelengths. As shown, the Nd:glass absorption spectrum exhibits a strong absorption band at 530 nm, 590 nm, 740 nm, 800 nm, and 820 nm. The pump pulse duration is around 100 μs, that is somewhat shorter than the lifetime of the excited states. In the practice of the invention, the ideal source should be as directional as possible and somewhat tunable so that the pump energy can be deposited exactly where necessary.

An alexandrite free-running laser is very close to being the ideal pump source of a Nd:glass amplifier. This laser can be tuned from 700 to 800 nm. Additionally, it has a 120-μs fluorescence life time permitting pulse durations in the free-running mode of around 50–100 μs. An alexandrite laser can emit free-running pulses of 1–15 J.

FIG. 3 is a schematic representation of individual Nd:glass rods pumped by a common free-running alexandrite laser, in accordance with the invention. As shown in this figure, the flash lamp-pumped amplifier heads which are contained in the known chirped pulse amplification system are replaced by individual Nd:glass rods 21, 22, and 23, pumped by a common free-running alexandrite laser 25. The Nd:glass rods are each longitudinally pumped by pump laser 25.

In the specific illustrative embodiment, Nd:glass rod 21 receives a chirped pulse, having a duration of approximately 1 ns. The short pulse is received via one of several optical splitters which combine the pumping energy with the received pulse. Nd:glass rod 23, in this embodiment, issues the stretched and amplified pulse, which is propagated to a compressor 26. The compressor, in this embodiment, restores the duration of the pulse to that of the originally received pulse.

In certain embodiments of the invention, the gain bandwidth of the system is improved by employing different types of glasses with different central frequencies. In this manner, the overall gain bandwidth of the entire system can be broadened, permitting efficient amplification of pulses 100 fs or shorter.

FIG. 4 is a graphical plot which shows the manner in which the individual rods combine their respective gain characteristics to achieve an overall gain bandwidth. A single type of Nd:glass has a gain bandwidth sufficient to amplify 300-fs pulses. Nd:glasses can have central frequencies covering a wavelength range from 10460 Å (fluoroberyllate) to 10880 Å (silicate), thus covering a range of over 400 Å. This gain bandwidth, which is shown as the graphical representations of FIG. 4, will be sufficient to amplify pulses as short as 30 fs.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A method of producing an ultra-high peak power pulse, the method comprising the steps of:
   receiving a short optical pulse having a predetermined duration from an optical oscillator;
   stretching in time the short optical pulse by a factor of approximately between 100 and 10,000 to produce a time-stretched optical pulse to be amplified;
   amplifying the time-stretched optical pulse in a solid state amplifying media, said step of amplifying additionally including the step of combining the time-stretched optical pulse with an optical energy generated by a laser used to pump the solid-state amplifying media; and
   compressing in time the amplified time-stretched optical pulse, whereby the amplitude of the resulting amplified time-stretched compressed optical pulse is increased.

2. The method of claim 1 wherein said step of amplifying is performed at an amplification factor of at least $10^3$.

3. The method of claim 1 wherein said step of compressing is performed to an extent whereby the amplified time-stretched compressed optical pulse is returned to the predetermined duration of the short optical pulse from the optical oscillator.

4. The method of claim 1 wherein said step of amplifying is performed in Nd:glass.

5. The method of claim 4 wherein said step of amplifying comprises the step of pumping said Nd:glass material.

6. The method of claim 5 wherein said step of pumping comprises the further step of energizing an alexandrite laser.

7. The method of claim 6 wherein said step of energizing comprises the further step of flash lamp pumping said alexandrite laser.

8. The method of claim 6 wherein said step of pumping is preformed at an approximate wavelength selected from 740 nm, 800 nm, and 820 nm.

9. The method of claim 6 wherein said step of pumping is performed using a pulse duration which is shorter than the lifetime of an excited state of said Nd:glass rods.

10. The method of claim 9 wherein said pulse duration is approximately between 50 and 100 μs.

11. The method of claim 6 wherein there is further provided the step of tuning said alexandrite laser within a range of approximately between 700 and 800 nm.

12. A system for producing an ultra-high peak power optical pulse, the system comprising:
- an optical oscillator for producing a short optical pulse having a predetermined duration;
- a plurality of glass rods, of the type which produce optical amplification, disposed in an optically serial arrangement having first and second ends, said plurality of glass rods being arranged at said first end thereof to receive said optical pulse from said optical oscillator, and at said second end thereof to output an amplified output pulse which has a duration longer than said predetermined duration of said short optical pulse from said optical oscillator;
- optical pump means for optically pumping said plurality of glass rods simultaneously, said optical pump means being formed of an alexandrite laser; and
- compressor means for reducing the duration of the amplified output pulse and producing at an output thereof the ultra-high peak power optical pulse.

13. The system of claim 12 wherein there is further provided optical means for receiving the optical pulse from said optical oscillator and a pumping energy from said optical pump means, said optical means being coupled optically to said first end of said plurality of glass rods.

14. The system of claim 12 wherein said alexandrite laser operates in a free-running mode.

15. The system of claim 12 wherein said glass rods are formed of Nd:glass.

16. The system of claim 15 wherein said Nd:glass rods are formed of respectively different types of glass, so as to have respectively different central frequency characteristics.

17. The system of claim 15 wherein said optical pumping means is a tunable optical pumping means, said tunable optical pumping means being tunable within a range of approximately between 700 and 800 nm.

18. The system of claim 12 wherein said short optical pulse from said optical oscillator is a chirped pulse.

* * * * *